United States Patent

Schrank et al.

(10) Patent No.: US 6,906,611 B2
(45) Date of Patent: Jun. 14, 2005

(54) CERAMIC COMPONENT COMPRISING AN ENVIRONMENTALLY STABLE CONTACT SYSTEM

(75) Inventors: Franz Schrank, Raaba (AT); Gerald Kloiber, Feldkirchen (AT)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 10/475,455

(22) PCT Filed: May 7, 2001

(86) PCT No.: PCT/DE01/01719

§ 371 (c)(1),
(2), (4) Date: Oct. 21, 2003

(87) PCT Pub. No.: WO02/091397

PCT Pub. Date: Nov. 14, 2002

(65) Prior Publication Data

US 2004/0113749 A1 Jun. 17, 2004

(51) Int. Cl.$^7$ ................................................ H01C 1/02
(52) U.S. Cl. ...................... 338/273; 338/268; 338/274; 338/329
(58) Field of Search ................................ 338/273, 274, 338/268, 329, 25; 257/793

(56) References Cited

U.S. PATENT DOCUMENTS

| 5,168,256 A | 12/1992 | Ishiguro et al. |
| 5,175,527 A | 12/1992 | Ishiguro et al. |
| 5,252,943 A | 10/1993 | Kitabayashi et al. |
| 5,841,183 A | 11/1998 | Ariyoshi |
| 5,896,081 A | 4/1999 | Tzeng et al. |

FOREIGN PATENT DOCUMENTS

| DE | 19851869 | 7/2000 |
| EP | 0 536 880 | 4/1993 |
| EP | 0 580 323 | 1/1994 |

OTHER PUBLICATIONS

Heissleiter, "Standartkonstruktion S861", *EPCOS Datenbuch*, p. 55 (1999). (Written translation notes included).

*Primary Examiner*—Cathy F. Lam
(74) *Attorney, Agent, or Firm*—Fish & Richardson P.C.

(57) ABSTRACT

A ceramic component includes a ceramic body, electrodes applied to the ceramic body, electrical connectors that connect the electrodes with one or both of an external circuit and a voltage source, a substance that connects the electrical connectors to the electrodes, and a casing that covers the electrodes at least partly. The substance is cured and electrically conductive, and contains a precious metal that is not silver.

14 Claims, 2 Drawing Sheets

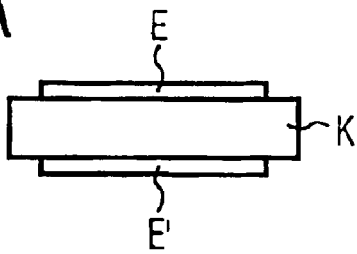
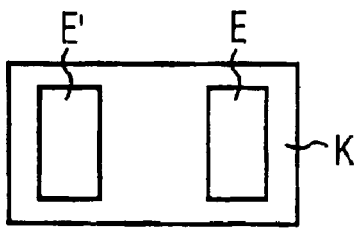
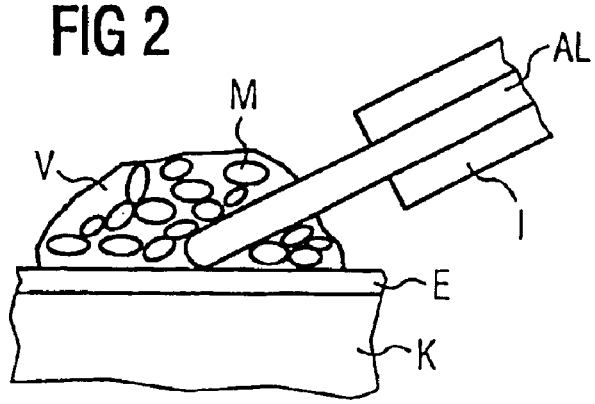
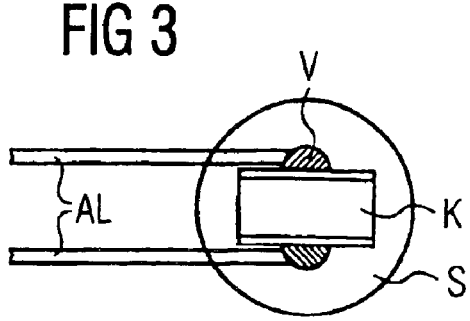

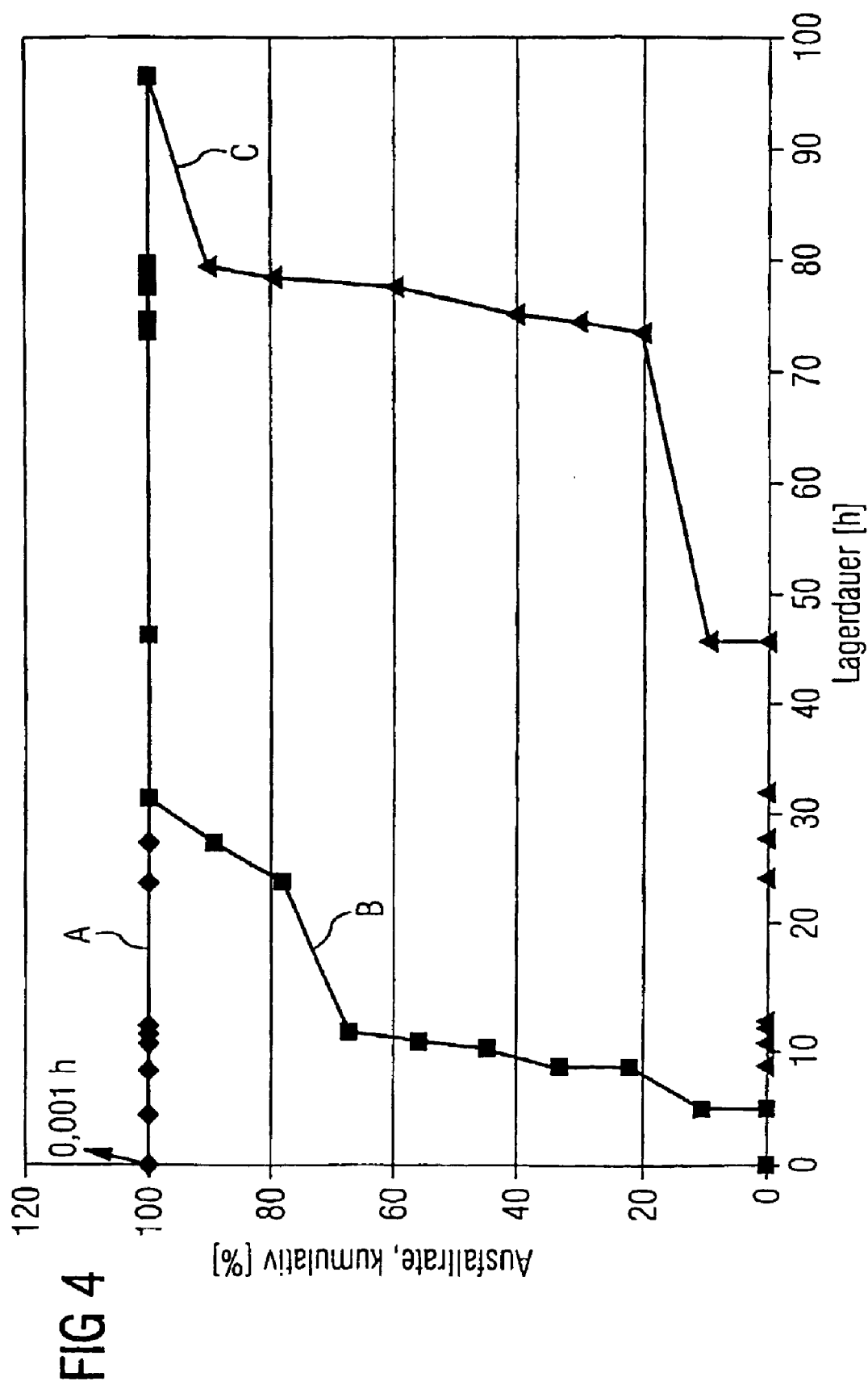

CERAMIC COMPONENT COMPRISING AN ENVIRONMENTALLY STABLE CONTACT SYSTEM

BACKGROUND

Miniaturized ceramic components, in particular, demonstrate an increasing drift of their electrical characteristics under the influence of moisture and/or water, which can result in total failure of the component if the effect of moisture continues. Studies have shown that this instability with regard to specific climate conditions is attributable to electromigration. Because of the voltage that is applied to the component, i.e., to electrodes of the component, when the component is in operation, a difference in potential exists between different electrical poles of the ceramic component. If conditions of use of the component are now such that a continuous moisture film can form between the electrodes, material transport of the electrode material from the anode to the cathode will result. The metals silver, tin, and lead, which are usually contained in the solder with which the electrical connectors are attached to the electrodes, are particularly affected by this electromigration. At the same time, the migration leads to the formation of metallic deposits on the path from the anode to the cathode, which can form continuous metallic films and tracks on the ceramic. As a result, resistance between the electrodes decreases dramatically, leading finally to short-circuiting and thereby to total failure of the ceramic component.

In the case of miniature ceramic components, which comprise, in the standard method of construction, a ceramic body with fired electrodes, soldered connector wires, and a plastic protective sheathing, a design that is reliably protected against electromigration, has not been known until now. Improved resistance to electromigration is achieved if epoxies modified to be hydrophobic are used as the plastic sheathing, as is described in older German patent application 198 51 869.2, which is not a prior publication. Glass-encapsulated sensors, in which the component is provided with a coating consisting of glass, represent a further improvement. However, high process temperatures are necessary to produce the glazing, so that no insulated connector wires can be used. Under climatically demanding conditions of use, damage caused by electrochemical corrosion of the connector wires and/or by migration over the glass body is observed here as well.

SUMMARY

It is the object of the invention to provide a ceramic component with improved contacting, which is more stable with regard to the effect of moisture and/or water.

This object is accomplished, according to the invention, with a component according to claim 1. Advantageous embodiments of the invention, as well as a method to produce the component, are evident from the other claims.

The invention is based on the idea of completely avoiding the use of migration-sensitive metals for electrodes and materials for the electrical connectors. It is therefore proposed to implement the electrical connectors using a connective mass that contains a precious metal, except silver, and guarantees both adhesion of the connectors on the electrodes and an electrically conductive connection.

As another protection against wetness, as well as against mechanical and chemical effects, a protective sheathing is provided, at least over the electrodes.

With the invention, a time between failures that is many times longer than that of the stated standard version of miniaturized ceramic components is achieved in an impressive manner; in other words, a significantly longer lifetime than that of known standard components. Furthermore, the component is easy to produce and causes no significantly increased costs when used for miniaturized components.

Further improved climate resistance is obtained if the protective sheathing comprises a plastic that has been modified to be hydrophobic. Specifically, an epoxy resin that has been modified to be hydrophobic can be used. Modification of epoxy resins to make them hydrophobic is particularly successful when non-polar groups, particularly groups of fluoridated alkyl and cycloalkyl, are used.

The electrically conductive connective mass contains a precious metal, which is selected, for example, from the group of gold, palladium, or platinum. In this regard, the connective mass can be a conductive adhesive; in other words, a curable organic composition with filler particles that comprise the stated precious metal. Such a conductive adhesive is easy to apply and can be cured under mild conditions, for example by means of UV radiation or a short-term temperature increase to moderate temperatures, for example 150 degrees.

In another further improved embodiment of the invention, a firing paste that contains one of the stated precious metals is used as the connective mass. Such firing pastes are known and contain not only the metallic particles that produce the conductivity, but also ceramic constituents and an organic binder for plastification. The ceramic constituents serve to allow sintering of the paste, thereby guaranteeing good adhesion on a ceramic or metal surface, on the one hand, and a high level of mechanical stability, because the paste sinters together, on the other hand.

When using either a conductive adhesive or a firing paste, conductivity can be adjusted by means of the type and proportion of the metal particles.

Wires, in particular, are provided as electrical connectors. The wires are provided with an electrically insulating mantling at least on the component side; in other words, on the end of the electrical connectors that is directly adjacent to the component. Although the material for the mantling can, in principle, be freely selected, when the invention is implemented with conductive adhesive, plastics that are resistant to high temperatures are preferably used as mantling for electrical connectors applied with firing paste. Such plastics resistant to high temperatures are selected, for example, from among high-performance polymers, particularly polyaryl ether ketone, polyimide, or polytetrafluoroethylene. Such mantling made from plastics resistant to high temperatures is not sensitive to the effect of high temperatures up to more than 400 C, particularly a short-term effect. This is advantageous for the invention, because the firing paste can be sinter-compacted within a few seconds, by means of a short temperature increase to a temperature T3 between 700 and 950 degrees Celsius, without the mantling in the immediate vicinity being damaged during this time.

Using the connectors attached according to the invention, the protective sheathing, and the electrical connectors insulated by means of the mantling, ceramic components according to the invention are extremely stable, even under severe climatic stress, and even withstand use under water for several hours.

Of course, the elimination of metals that are subject to electromigration also affects the electrodes located on the component. These can, in particular, be fired electrodes, for which one of the stated precious metals is also suitable. It is also possible, however, to apply the electrodes by vapor deposition or sputtering.

The following explains the invention in greater detail, using exemplary embodiments and the related four figures.

DESCRIPTION OF THE DRAWINGS

FIG. 1A shows a ceramic component body provided with electrodes, in schematic cross-section;

FIG. 1B shows another component body with electrodes, in a top view;

FIG. 2 shows an electrical connector according to the invention, in schematic cross-section;

FIG. 3 shows a finished component, in schematic cross-section;

FIG. 4 shows cumulative failure rates of the components according to the invention without a protective sheathing, in water, and with voltage applied.

DETAILED DESCRIPTION

The production of a miniature temperature sensor on the basis of an NTC ceramic is described as an exemplary embodiment. The figures, which serve for a better understanding of the invention, are therefore drawn only schematically, and not to scale.

FIG. 1A shows a ceramic body K. Ceramic body K comprises an NTC ceramic, i.e., a ceramic with negative temperature resistance coefficients), and may be used in a miniature temperature sensor. Examples of ceramics that may be used in ceramic body K include, but are not limited to, Mn—Ni oxides, Mn—Ni—Co oxides and Mn—Ni—Fe oxides. For a miniature temperature sensor, ceramic body K may have dimensions of $1.50 \times 1.25 \times 0.35$ mm$^3$. On its main surfaces, ceramic body K is provided with electrodes E, which may be fired electrodes. According to the invention, the fired electrodes are based on (e.g., formed from) a precious metal. Silver, however, may not be used in forming the fired electrodes because of its ability to facilitate electromigration. Fired electrodes that are based on a gold paste are preferred, but those based on platinum or palladium also may be used. FIG. 1B shows a schematic top view of another embodiment. The embodiment of FIG. 1B need not be implemented in temperature sensors. In that embodiment, two electrodes E are applied on the same surface of ceramic body K, (in the case of a ceramic component).

In order to connect the ceramic component with surrounding circuitry or with a voltage source, the electrodes are connected with electrical connectors. A connector conductor AL, structured as a wire, serves as a connector, for example. With the exception of silver, the material selected for the connector conductor does not have a great influence on the desired climate resistance of the component. At least at the end of the connector conductor AL that faces the component, the conductor is provided with a mantling I that serves for insulation purposes. This mantling comprises, for example, a thermoplastic resistant to high temperatures.

The connector conductor with the electrodes E is connected, for example, with a gold paste that contains glass paste, which contains not only the gold particles that guarantee electrical conductivity, but also glass constituents. The viscosity of the paste is adjusted in such a manner that it can still be processed in ""liquid"" form, on the one hand, but on the other hand is already sufficiently pasty and sticky so that good adhesion both on the electrode and on the connector conductor is guaranteed. Preferably, the ends of the connector conductors AL are coated with the paste and subsequently brought into contact with the electrode E. The adhesion capacity of the paste is sufficient to hold the ceramic component between two connector conductors AL.

For firing the paste, a three-stage temperature treatment is carried out. In a first stage, at a first temperature T1, up to approximately 150 degrees Celsius, the solvent contained in the paste is removed. In a second stage, at a temperature T2, which is selected to be between 250 and 400 degrees Celsius, the organic binder of the paste is burned out in an environment that contains oxygen. In order to compact the remaining inorganic constituents, sintering is carried out in a third stage, at a temperature T3, between 700 and 950 degrees Celsius. During this step, the fired electrode achieves its final conductivity, and also, a well adhering and mechanically stable bond between the connective conductor AL and the electrode E is produced by means of the sintering. The electrical connectors (AL) are attached using a cured, electrically conductive connector mass (V) containing a precious metal (M) that is not silver.

The sintering step is carried out in such a manner that the component is brought to the desired temperature T3 within as short a time as possible, and subsequently also cooled off again rapidly. Sintering compacting takes place within a time span ts, during which the component is heated to the sintering temperature T3. In the exemplary embodiment, it is sufficient if ts $\leq$ 3s. The sintering step is optimized in such a maimer that the integral temperature stress on the component remains low. In this way, the possible drift in the electrical characteristics caused by the temperature stress is minimized. For this purpose, it can be better to carry out the sintering at a higher temperature T3 but at the same time using a shorter time span ts. This is also advantageous for the mantling I of the connective conductor AL, which in this way remains unharmed during the sintering step. FIG. 2 shows details of the component after this step.

After an electrical and mechanical connection between the component, i.e., the electrode E, and the connector conductor AL has been produced in this manner, a protective sheathing S is produced in the last step. For this purpose, the entire component is provided with a protective sheathing made of a plastic, particularly of an epoxy that has been modified to be hydrophobic. This can take place, for example, by the component being briefly dipped into liquid epoxy resin, and the drop that adheres to the component after dipping being subsequently cured. FIG. 3 shows the component provided with the protective sheathing S, in a schematic cross-section.

In another variant, an adhesive that contains metal particles, a so-called metal conductive adhesive, is used to attach the connector conductor AL to the ceramic body K provided with electrodes E. Application of the adhesive preferably takes place by means of an imprinting process onto the ends of the connector conductor AL, which are preferably flattened for this purpose. Here again, the wet adhesive force of the conductive adhesive can be used to hold the component between two connector conductors AL. To cure the adhesive, which is produced on an epoxy basis, for example, it is subjected to a curing cycle. This cycle can take place in one or more steps, whereby the curing temperatures and the curing time depend on the type of adhesive, i.e., epoxy being used. Metals with a low tendency to migrate, such as gold, platinum, palladium, and others, are used as the metallic filler.

In the final step, the entire component is encapsulated with a protective sheathing in this variant as well.

To test the climate resistance of the components according to the invention, they are tested together with conventional standard components (NTC sensors not according to the invention, having fired electrodes, soldered connector wires, and a protective sheathing made of plastic). Under conditions of voltage storage (3V direct current) in water, after pretreatment of the sensors (5 bar water under pressure or temperature shock stress, 100 cycles −55°/155° C.), all of the tested standard elements failed after a test period of 56 days. In the case of the components according to the invention with the connector lines applied by means of conductive adhesive, approximately 10% of the components failed. In the case of components according to the invention with the connector lines sintered on (Variant 1), not a single failure is observed during this test period.

In another test, components according to the invention and standard components without protective sheathing, to which voltage is applied, are each dipped into a volume of 10 microliters of desalinated water. 3 volts of direct current are applied as the operating voltage. Among the standard components, out of 10 test samples, the last failure is observed approximately 4 seconds after the voltage was turned on. In the case of components produced according to the invention according to Variant 2, an initial change in the electrical values is observed after an operating period under these conditions of approximately 4.9 hours, but this does not yet mean that the component has failed. Components produced according to the invention according to Variant 1 show initial changes after an operating period of 47 hours under water, but no failure.

FIG. 4 graphically shows the cumulative failure rates determined in this test. The failure rates are plotted in percent, relative to the storage period in hours. The curve A for standard is practically unrecognizable because the sharp increase to a 100% failure rate within a few seconds represents a virtually rectangular curve. Curve B shows the failure rate of components produced according to the invention according to Variant 2. The first failures are observed after approximately 5 hours, whereas a 100% failure rate is not reached until after more than 30 hours. Curve C shows the failure rate of components produced according to the invention according to Variant 1.

From this drawing, the superiority in climate tests of components according to the invention compared to standard components is obvious. This makes it possible to use components according to the invention even in climatically demanding environments. For example, the miniature temperature sensors described can be used without problems in a work range from −55 to +155 degrees. Sensors produced according to Variant 1 withstand 10,000 cycles, for example, during which the components are brought from a low test temperature of −55 degrees to a high test temperature of 155 degrees Celsius within 10 seconds, and where the dwell time at the two test temperatures is in each instance 10 minutes. After these temperature cycles, the drift in electrical characteristics is determined, whereupon a drift of only 0.12%±0.37% (mean value±S, 80 test samples) is determined for the value R25.

Although the invention was shown in the exemplary embodiments using only temperature sensors, in principle it is transferable to virtually all ceramic components, particularly, however, to miniature ceramic components, which generally demonstrate a particularly high failure rate in climate tests.

What is claimed is:

1. A ceramic component, comprising:
   a ceramic body;
   electrodes applied to the ceramic body;
   electrical connectors that connect the electrodes with one or both of an external circuit and a voltage source;
   a substance that connects the electrical connectors to the electrodes, the substance being cured and electrically conductive, the substance containing a precious metal that is not silver, wherein the precious metal comprises at least one of Au, Pd, and Pt; and
   a casing that covers the electrodes at least partly;
   wherein the casing comprises plastic that is hydrophobic.

2. The ceramic component according to claim 1, wherein the plastic is an epoxy resin.

3. The ceramic component according to claim 1, wherein the substance is a firing paste that comprises ceramic constituents.

4. The ceramic component according to claim 1, wherein the substance comprises a conductive adhesive.

5. The ceramic component according to claim 1, wherein the electrodes are gold-fired electrodes.

6. A ceramic component, comprising:
   a ceramic body;
   electrodes applied to the ceramic body;
   electrical connectors that connect the electrodes with one or both of an external circuit and a voltage source;
   a substance that connects the electrical connectors to the electrodes, the substance being cured and electrically conductive, the substance containing a precious metal that is not silver, wherein the precious metal comprises at least one of Au, Pd, and Pt; and
   a casing that covers the electrodes at least partly;
   wherein the electrical connectors include a mantling that is resistant to temperatures above a predetermined level.

7. The ceramic component according to claim 6, wherein the mantling comprises a polymer.

8. The ceramic component of claim 7, wherein the polymer comprises at least one of polytetrafluoroethylene, polyimide, and polyaryl ether ketone.

9. A method of producing a ceramic component, comprising:
   applying electrodes to a ceramic body, the electrodes containing a precious metal;
   fixing electrical connectors to the electrodes using a substance that is cured, the substance being electrically conductive, and the substance containing a precious metal that is not silver; and
   applying a plastic casing over the electrodes;
   wherein the substance comprises a firing paste that contains ceramic constituents;
   wherein curing of the firing paste comprises:
      removing solvent from the firing paste at a temperature T1;
      burning off organic portions of the firing paste at a temperature T2; and
      heating the firing paste to a temperature T3 for a time span t1 that is on the order of seconds, the heating of the firing paste resulting in substantially complete sintering of the ceramic constituents; and
   wherein T1<T2<T3.

10. The method according to claim 9, wherein $T1 \leq 150°$ C., $250° \leq T2 \leq 400°$ C., $700° \leq T3 \leq 950°$ C., and $t1 \leq 3$ s.

11. A ceramic component, comprising:
    a ceramic body;
    electrodes applied to the ceramic body;
    electrical connectors that connect the ceramic component to external circuitry;
    a substance that connects the electrical connectors to the electrodes, the substance comprising a precious metal that is not silver, wherein the precious metal comprises at least one of Au, Pd, and Pt; and a casing that covers at least the electrodes;

wherein the casing comprises plastic that is hydrophobic.

12. The ceramic component according to claim 11, wherein the substance comprises a firing paste that comprises ceramic constituents.

13. The ceramic component according to claim 11, wherein the substance comprises an electrically conductive adhesive.

14. The ceramic component of claim 11, wherein the electrodes contain a precious metal.

* * * * *